United States Patent
Carlson

(10) Patent No.: US 6,577,441 B2
(45) Date of Patent: Jun. 10, 2003

(54) OPTICAL AMPLIFIER

(75) Inventor: Steven A. Carlson, Cambridge, MA (US)

(73) Assignee: Optodot Corporation, Cambridge, MA (US)

( * ) Notice: Subject to any disclaimer, the term of this patent is extended or adjusted under 35 U.S.C. 154(b) by 0 days.

(21) Appl. No.: 09/944,935

(22) Filed: Aug. 31, 2001

(65) Prior Publication Data

US 2002/0027705 A1 Mar. 7, 2002

Related U.S. Application Data

(60) Provisional application No. 60/229,764, filed on Sep. 1, 2000.

(51) Int. Cl.$^7$ .............................. H01S 3/00; H01S 3/14; F21V 9/04
(52) U.S. Cl. ......................... 359/342; 372/39; 252/587
(58) Field of Search ........................... 359/342; 372/39; 252/587

(56) References Cited

U.S. PATENT DOCUMENTS

| 5,409,783 A | * | 4/1995 | Tang et al. | 428/690 |
| 5,657,156 A | * | 8/1997 | van Veggel et al. | 359/342 |
| 6,381,059 B1 | * | 4/2002 | Carlson | 359/244 |

OTHER PUBLICATIONS

Frolov et al, Lasing and Stimulated Emission in phi–Conjugated Polymers (2000), IEEE Journal Of Quantum Electronics, vol. 36. No. 1. pp 2–11.*

* cited by examiner

Primary Examiner—Mark Hellner
(74) Attorney, Agent, or Firm—Sampson & Associates, P.C.

(57) ABSTRACT

An optical amplifier includes an organic luminescent free radical compound, preferably a salt of a radical cation or a salt of a radical anion, wherein an excited state of the luminescent free radical compound undergoes stimulated emission in an infrared wavelength region, such as 1500 to 1650 nm. Suitable organic luminescent free radical compounds include aminium infrared-absorbing dyes.

36 Claims, No Drawings

OPTICAL AMPLIFIER

RELATED APPLICATION

This application claims priority to and benefit of U.S. Provisional Patent Application Ser. No. 60/229,764, filed Sep. 1, 2000, the disclosure of which is fully incorporated herein in its entirety for all purposes.

FIELD OF THE INVENTION

The present invention relates to the field of optical amplifiers and, particularly, pertains to optical amplifiers which operate in an infrared wavelength region. More specifically, this invention pertains to optical amplifiers comprising an organic luminescent free radical compound, wherein the luminescent free radical compound emits photons in an infrared wavelength region as a result of a photon absorption by the free radical compound followed by stimulated emission from an excited state of the luminescent free radical compound.

BACKGROUND OF THE INVENTION

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the quantity and speed of data communications over fiber optics systems rapidly increases due to the growing demand from Internet usage and other communications, optical amplifiers are of high interest to increase optical signal power to overcome signal losses from attenuation over long distances in the fiber optic transmission line as well as from insertion of optical components, such as optical switches, optical splitters, and optical combiners, into the fiber optic transmission line.

A variety of optical amplifiers are known, particularly rare earth doped optical fibers, such as, for example, described in U.S. Pat. Nos. 5,452,124 to Baker; 5,801,879 to Burton et al.; 5,936,762 to Samson et al.; 6,101,016 to Roberts et al.; 6,101,025 to Naganuma; 6,104,527 to Yang; 6,104,733 to Espindola et al.; and 6,067,187 to Onaka et al. U.S. Pat. No. 5,881,200 to Burt describes an optical amplifier containing a colloid of quantum dots in the light-guiding region of the optical fiber.

Rare earth doped optical fibers used in optical amplifiers typically are glass fibers of 10 to 30 meters in length because of the very low molar absorption extinction coefficients of the rare earth ions and are also not suitable for use in polymer optical fibers, where the polymer or plastic fibers are desirable for ease and low cost of fabrication of optical components, such as optical switches and amplifiers. It would be advantageous if optical amplifiers were available which avoided the size, complexity of fabrication, and high cost of rare earth doped optical amplifiers.

SUMMARY OF THE INVENTION

An organic free radical compound where the excited state is an excited state from the free radical ground state may have a rapid internal conversion from this excited state back to the ground state with a concomitant production of heat in a time scale of as low as 1 picosecond or less. In one example of this, an organic radical cation compound absorbs photons in the presence of a thermochromic compound, converts the absorbed photons to heat in less than 1 nanosecond, and causes a change in absorption due to heat-induced changes in the thermochromic compound, as described in PCT International Publication No. WO 98/54615, titled "Optical Shutter Device" and published Dec. 3, 1998, to Carlson. The excited state of the organic free radical compound may undergo a photoreaction, such as a photo-induced electron transfer reaction, which causes changes in the absorption. This photoreaction may occur faster and with higher efficiency than internal conversion of the absorbed photons to heat or, alternatively, may have a similar or slightly lower speed and efficiency than this internal conversion to heat so that both photoreaction and heat formation processes occur, as, for example, described in U.S. Provisional Pat. Application Ser. No. 60/163,349, titled "Optical Shutter" and filed Nov. 3, 1999, to Carlson, the disclosure of which is fully incorporated herein by reference.

One aspect of the present invention pertains to an optical amplifier comprising an organic luminescent free radical compound in which an excited state of the free radical compound upon photon absorption includes stimulated emission in an infrared wavelength region. In one embodiment, the luminescent free radical compound is a salt of a radical cation, preferably a salt of an aminium radical cation, and most preferably, the radical cation is a tris (alkyl-substituted and/or non-substituted aminophenyl) aminium hexafluoroantimonate. In one embodiment, the luminescent free radical compound is a salt of a radical anion, preferably an anthrasemiquinone radical anion.

In one embodiment of the optical amplifier of this invention, the luminescent free radical compound is a salt of a radical cation, and the optical amplifier further comprises a salt of a radical anion. In one embodiment, the luminescent free radical compound is a salt of a radical anion, and the optical amplifier further comprises a salt of a radical cation. In one embodiment, the luminescent free radical compound comprises one or more salts of a radical cation and one or more salts of a radical anion, and the emission results from a stimulated emission from the excited states of at least one of the one or more salts of a radical cation and of at least one of the one or more salts of a radical anion. In one embodiment, the luminescent free radical compound comprises a salt of a radical cation and a radical anion.

In one embodiment of the optical amplifier of the present invention, the infrared wavelength region of the stimulated emission is from 700 to 1000 nm. In one embodiment, the infrared wavelength region of the stimulated emission is from 1000 to 2000 nm, preferably from 1400 to 1700 nm, and more preferably from 1500 to 1690 nm.

In one embodiment of the optical amplifier of this invention, the stimulated emission occurs in less than 1 nanosecond after absorption of photons by the luminescent free radical compound, preferably occurs in less than 0.1 nanoseconds, more preferably occurs in less than 0.01 nanoseconds, and most preferably occurs in less than 0.001 nanoseconds.

In one embodiment of the optical amplifier of the present invention, the excited state of the luminescent free radical compound is populated by ultraviolet laser radiation. In one embodiment, the excited state is populated by visible laser radiation, and preferably is populated by infrared laser radiation, such as 980 nm or 1350 nm laser radiation. In one embodiment, the excited state is populated by absorption of photons by a free radical moiety ground state of the luminescent free radical compound.

In one embodiment of the optical amplifier of this invention, the optical amplifier further comprises a metallized layer on at least one side of a layer comprising the luminescent free radical compound of the optical amplifier. In one embodiment, the metallized layer comprises aluminum.

As will be appreciated by one of skill in the art, features of one aspect or embodiment of the invention are also applicable to other aspects or embodiments of the invention.

DETAILED DESCRIPTION OF THE INVENTION

The optical amplifiers of the present invention provide superior optical signal power amplification, and are particularly useful in systems where a polymer-based optical amplifier component is desirable.

Organic Free Radical Compounds

The term "organic free radical compound," as used herein, pertains to an organic compound which comprises at least one free unpaired electron on a neutral or a positively-charged atom, such as, for example, a carbon atom, a nitrogen atom, or an oxygen atom, in the ground state of the organic compound. Suitable organic free radical compounds for the optical amplifiers of the present invention include neutral organic free radicals, salts of organic free radical cations, and salts of organic free radical anions. For purposes of brevity, the terms "organic free radical cation", "organic radical cation", and "radical cation" are used interchangeably herein. The word "cation," as used herein, pertains to a positively charged atom in a molecule, such as, for example, a positively charged nitrogen atom. Similarly, the terms "organic free radical anion", "organic radical anion", and "radical anion" are used interchangeably herein. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable salts of organic free radical cations for the optical amplifiers of this invention include, but are not limited to, salts of aminium radical cations, such as, for example, tris (alkyl-substituted and/or non-substituted aminophenyl) aminium hexafluoroantimonates. Such types of infrared-absorbing aminium compounds are known to be stable radical compounds that may exist in a layer of material, such as in a polymeric coating, under normal room conditions for an extended period of time.

Examples of suitable salts of organic free radical anions for the optical amplifiers of the present invention include, but are not limited to, salts of substituted 9,10-anthrasemiquinone radical anions. The unsubstituted 9,10-anthrasemiquinone radical anion is described in *Photochemistry and Photobiology*, Vol. 17, pages 123–131 (1973) by Carlson and Hercules.

Due to the presence of the free radical moiety, organic free radical compounds have unique longer wavelength absorptions and unique photothermal, photochemical, and photoluminescence transformations, particularly when compared to the corresponding non-free radical compounds. For example, the absorption spectra of IR-165, a trade name for an aminium dye available from GPT Glendale, Lakeland, Fla., and its extremely rapid internal conversion of absorbed photons to heat is described in various publications, such as in PCT International Publication No. WO 98/54615, and references therein, to Carlson. Also, for example, the absorption spectra of 9,10-anthrasemiquinone radical anion and its photochemistry are described in the above-referenced publication by Carlson and Hercules and in *The Photochemistry of Anthraquinone and Related Compounds*, Ph.D. Thesis, Massachusetts Institute of Technology, 1969, by Carlson. A highly efficient photoluminescence may also be obtained in organic free radical compounds, for example by selection of the specific substituent groups for aminium dyes and 9,10-anthrasemiquinone compounds.

The present invention is directed at utilizing organic luminescent free radical compounds that undergo a luminescent emission that competes with and, preferably, exceeds the speed of photon-to-heat internal conversion, photoreactions, and other photon-induced processes for use in an optical amplifier for amplifying signals, where the desired stimulated emission upon optical excitation or pumping is a result of the formation of a high population, sometimes referred to as population inversion, of an excited state of the organic free radical compound followed by an interaction with the incoming signal photons to release photons identical to the incoming photons. The amplification gain of the signal beam from an optical input source involves making a transition back from the excited state, sometimes referred to as a high energy state, to the ground state, sometimes referred to as a low energy state. This transition emits a photon, provided the energy lost in making the transition matches the energy of the photons in the signal beam. Thus, the excited state is stimulated to decay, as referred to herein by the term "stimulated emission," by the arrival of the signal wavelength photon, and this causes amplification gain of the optical signal.

Optical Amplifiers and Methods of Making Optical Amplifiers

One aspect of the present invention pertains to an optical amplifier for amplifying signals in an infrared wavelength region or band comprising an organic luminescent free radical compound, typically a fluorescent free radical compound, in which the luminescent free radical compound includes stimulated emission in the infrared wavelength region. In one embodiment, the luminescent free radical compound is doped into a length of an optical waveguide, such as an optical fiber, which waveguide is pumpable by light energy at a pump wavelength and which light energy causes amplification gain of the optical signals with luminescence of the free radical compound. The terms "infrared," "infrared wavelength region," and "infrared wavelength band," as used herein, pertain to wavelengths from about 700 nm to about 2000 nm. The terms "visible" and "visible wavelength region," as used herein, pertain to wavelengths from about 400 to about 700 nm. In one embodiment, the luminescent free radical compound is a salt of a radical cation, preferably a salt of an aminium radical cation, and most preferably, the salt of the radical cation is a tris (alkyl-substituted and/or non-substituted aminophenyl) aminium hexafluoroantimonate where the amino-substituted groups are not completely symmetrical in the overall molecular structure and are, for example, in the case of analogs of IR-165, absent or different on one or more of the four phenyl groups bonded to the core phenylenediamine-type moiety. A preferred luminescent free radical compound is a salt of 1,4-benzenediamine-N,N-dibutyl-N',N'-bis[4-(dibutylamino)phenyl] radical cation, such as, for example, the hexafluoroantimonate salt which is available under the trade name of IR-99 from GPT Glendale, Lakeland, Fla. IR-99 has an intense absorption peak at about 1000 nm, absorbs out to about 1200 nm, and fluoresces at longer wavelengths above 1200 nm. Thus, a pump wavelength of about 980 nm is particularly suitable for use with IR-99 and other organic luminescent free radical compounds. In one embodiment, the luminescent free radical compound is a salt of a radical anion, preferably a substituted anthrasemiquinone radical anion.

In one embodiment of the optical amplifier of this invention, the luminescent free radical compound is a salt of a radical cation, and the optical amplifier further comprises a salt of a radical anion. The stimulated emission occurs as a result of the radical cation forming an excited state with a population greater than that of the ground state, but the radical anion increases the efficiency of the luminescence.

In one embodiment, the luminescent free radical compound is a salt of a radical anion, and the optical amplifier further comprises a salt of a radical cation. The stimulated emission occurs as a result of the radical anion forming an excited state with the population greater than that of the ground state, but the radical cation increases the efficiency of the luminescence.

In one embodiment, the luminescent free radical compound comprises one or more salts of a radical cation and one or more salts of a radical anion, and the emission results from a stimulated emission from the excited states with the population greater than that of the ground states of at least one of the one or more salts of a radical cation and of at least one of the one or more salts of a radical anion.

In one embodiment, the luminescent free radical compound comprises a salt of a radical cation and a radical anion. This association of the radical cation molecules and the radical anion molecules in close proximity to each other, such as, for example, using a substituted 9,10-anthrasemiquinone radical anion as the anion for some or all of an aminium radical cation, may enhance the speed and efficiency of the stimulated emission.

In one embodiment of the optical amplifier of the present invention, the infrared wavelength region of the stimulated emission is from 700 to 1000 nm. In one embodiment, the near-infrared wavelength region of the stimulated emission is from 1000 to 2000 nm, preferably from 1400 to 1700 nm, and more preferably from 1500 to 1650 nm.

In one embodiment of the optical amplifier of this invention, the stimulated emission occurs in less than 1 nanosecond after absorption of photons by the luminescent free radical compound, preferably occurs in less than 0.1 nanoseconds, more preferably occurs in less than 0.01 nanoseconds, and most preferably occurs in less than 0.001 nanoseconds.

In one embodiment of the optical amplifier of the present invention, the excited state of the luminescent free radical compound is populated or pumped by ultraviolet laser radiation. In one embodiment, the excited state is populated by visible laser radiation, and preferably is populated by infrared laser radiation, such as 980 nm and 1350 nm laser radiation. These laser pump sources are optically coupled to the optical waveguide or fiber which comprises the luminescent free radical compound and which is also coupled to the optical signal beam input source to be amplified and to an output port for emission of the optical signals after amplification, as is known in the art of pumping and coupling optical amplifiers. Also, WDM couplers and other optical couplers, as is known in the art of coupling optical amplifiers, may be utilized to provide unidirectional and bi-directional transmission for the amplified optical signal. The process of amplification occurs as the pump radiation propagates along the optical waveguide comprising the organic luminescent free radical compound, which undergoes absorption to populate an excited state. Propagation of a weak signal beam, such as, for example, a signal at 1550 nm, through the optical waveguide leads to the process of stimulated emission to amplify the signal beam. Thus, the doped waveguide, such as a fiber, is pumped by the pumping light. When the signal light is supplied to the doped waveguide in its pumped condition, the signal light is amplified.

In one embodiment, the excited state is populated by absorption of photons by a free radical ground state of the luminescent free radical compound. This is particularly important where the excited states of the free radical moiety ground state of the free radical compound can not be efficiently populated by direct absorption by a ground state of a non-free radical moiety of the free radical compound, such as, for example, an aromatic moiety, followed by subsequent internal conversion to a lower excited state directly related to the free radical moiety ground state. The low energy involved in forming an excited state of organic luminescent free radical compounds, such as, for example, IR-99, also may allow the excited state to be populated by electrically pumping, as is known in the art of electrically pumping semiconductor optical amplifiers.

One aspect of this invention pertains to fiber optic communications equipment comprising an optical amplifier of the present invention, as described herein, to overcome signal losses.

Another aspect of this invention pertains to a laser comprising an optical amplifier of the present invention, as described herein, to provide amplification of the laser output signal.

In one embodiment of the optical amplifier of this invention, the optical amplifier further comprises a metallized layer on at least one side of a layer comprising the luminescent free radical compound of the optical amplifier. In one embodiment, the metallized layer comprises aluminum. This metallized layer may serve a variety of functions, such as, for example, reflecting more incident radiation back through the layer comprising the luminescent free radical compound and acting as an enhanced or a reduced reflective element in an optical amplifier of this invention.

The organic nature of the organic luminescent free radical compounds and the optical amplifiers of the present invention are advantageous for ease of fabrication, such as by conventional methods of coating or plastic molding, in comparison to inorganic glass materials typically used in optical or hybrid optical amplifiers. Alternatively, the luminescent free radical compounds may be incorporated or doped into an inorganic glass fiber, for example, by imbibition of a solution comprising the luminescent free radical compound into the inorganic glass fiber or by a sol gel-related process to make an optical glass fiber or other optical glass configuration. Examples of suitable sol gel-related processes include, but are not limited to, casting of a colloidal metal oxide sol and a luminescent free radical compound incorporated directly in the sol prior to formation of the gel and by impregnation of a solution comprising a luminescent free radical compound into the gel. The extremely high molar absorption extinction coefficients for many organic free radical compounds, such as the aminium dyes which are about 10,000 times higher than for erbium doped ions used in conventional optical amplifiers, are useful in making the amount of luminescing material and/or the length of organic free radical compound-doped fiber or optical waveguide to be much less than for rare earth doped amplifiers.

Besides doping the luminescent free radical compound into glass optical fibers, other types of optical waveguides, besides optical glass fibers, as known in the art of optical waveguides, may be utilized for doping the luminescent free radical compounds into a length of an optical waveguide for the optical amplifiers of the present invention. For example, other suitable optical waveguides include single mode optical glass fibers such as those with an active core area of about 8 microns in diameter, hollow glass fibers where a solid or liquid composition comprising the luminescent free radical compound is incorporated into the hollow area, plastic or polymer optical fibers, and planar or channel optical waveguides comprising polymer or inorganic materials. The amount of organic luminescent free radical dopant in the optical waveguide may vary over a wide range depending, for example, on optimizing the luminescence amplification efficiency by reducing any concentration quenching and whether any disordered, scattering, or other materials are present to affect the wavelength range and efficiency of the amplification.

Another aspect of the present invention pertains to methods of making optical amplifiers, as described herein, wherein the methods comprise the step of doping an optical waveguide, such as an optical fiber, with an organic luminescent free radical compound, wherein an excited sate of the free radical compound includes stimulated emission in an infrared wavelength region. In one embodiment, the optical waveguide is a polymer optical fiber. In one embodiment, the optical waveguide is a glass optical fiber. In one embodiment, the optical waveguide is a single mode optical fiber, preferably a single mode glass optical fiber.

While the invention has been described in detail and with reference to specific and general embodiments thereof, it will be apparent to one skilled in the art that various changes and modifications can be made therein without departing from the spirit and scope thereof.

What is claimed is:

1. An optical amplifier for amplifying signals in an infrared wavelength region, said amplifier comprising an organic luminescent free radical compound, wherein an excited state of said free radical compound includes stimulated emission in an infrared wavelength region.

2. The optical amplifier of claim 1, wherein said luminescent free radical compound is doped into a length of an optical waveguide, which waveguide is pumpable by light energy at a pump wavelength and which light energy causes amplification gain of said signals with luminescence of said free radical compound.

3. The optical amplifier of claim 2, wherein said waveguide is an optical fiber.

4. The optical amplifier of claim 2, wherein said waveguide is a single mode optical fiber.

5. The optical amplifier of claim 2, wherein said pump wavelength is about 980 nm.

6. The optical amplifier of claim 1, wherein said luminescent free radical compound is a salt of a radical cation.

7. The optical amplifier of claim 6, wherein said radical cation is an aminium radical cation.

8. The optical amplifier of claim 6, wherein said salt of a radical cation is a tris (alkyl-substituted aminophenyl) aminium radical cation.

9. The optical amplifier of claim 6, wherein said luminescent free radical compound is a salt of 1,4-benzenediamine-N,N-dibutyl-N', N'-bis[4-(dibutylamino) phenyl] radical cation.

10. The optical amplifier of claim 1, wherein said luminescent free radical compound is a salt of a radical anion.

11. The optical amplifier of claim 10, wherein said radical anion is an anthrasemiquinone radical anion.

12. The optical amplifier of claim 1, wherein said luminescent free radical compound is a salt of a radical cation, and wherein said optical amplifier further comprises a salt of a radical anion.

13. The optical amplifier of claim 1, wherein said luminescent free radical compound is a salt of a radical anion, and wherein said optical amplifier further comprises a salt of a radical cation.

14. The optical amplifier of claim 1, wherein said luminescent free radical compound comprises one or more salts of a radical cation and one or more salts of a radical anion, and further wherein said stimulated emission results from a stimulated emission from at least one of said one or more salts of a radical cation and from at least one of said one or more salts of a radical anion.

15. The optical amplifier of claim 1, wherein said luminescent free radical compound comprises a salt of a radical cation and a radical anion.

16. The optical amplifier of claim 1, wherein said infrared wavelength region is from about 700 to 1000 nm.

17. The optical amplifier of claim 1, wherein said infrared wavelength region is from about 1000 to 2000 nm.

18. The optical amplifier of claim 1, wherein said infrared wavelength region is from about 1400 to 1700 nm.

19. The optical amplifier of claim 1, wherein said infrared wavelength region is from about 1500 to 1650 nm.

20. The optical amplifier of claim 1, wherein said stimulated emission occurs in less than 1 nanosecond after absorption of photons by said luminescent free radical compound.

21. The optical amplifier of claim 1, wherein said stimulated emission occurs in less than 0.1 nanoseconds after absorption of photons by said luminescent free radical compound.

22. The optical amplifier of claim 1, wherein said stimulated emission occurs in less than 0.01 nanoseconds after absorption of photons by said luminescent free radical compound.

23. The optical amplifier of claim 1, wherein said stimulated emission occurs in less than 0.001 nanoseconds after absorption of photons by said luminescent free radical compound.

24. The optical amplifier of claim 1, wherein said excited state is populated by ultraviolet laser radiation.

25. The optical amplifier of claim 1, wherein said excited state is populated by visible laser radiation.

26. The optical amplifier of claim 1, wherein said excited state is populated by infrared laser radiation.

27. The optical amplifier of claim 1, wherein said excited state is populated by absorption of photons by a free radical moiety ground state of said luminescent free radical compound.

28. The optical amplifier of claim 1, wherein said optical amplifier further comprises a metallized layer on at least one side of a layer comprising said luminescent free radical compound.

29. The optical shutter of claim 28, wherein said metallized layer comprises aluminum.

30. An optical amplifier comprising a luminescent salt of an organic radical cation, wherein an excited state of said luminescent salt of an organic radical cation undergoes stimulated emission in an infrared wavelength region.

31. An optical amplifier comprising a luminescent salt of an organic radical anion, wherein an excited state of said luminescent salt of an organic radical anion undergoes stimulated emission in an infrared wavelength region.

32. Fiber optic communications equipment comprising an optical amplifier according to claim 1.

33. A laser comprising an optical amplifier according to claim 1.

34. A method of making an optical amplifier, the method comprising the step of doping an optical waveguide with an organic luminescent free radical compound, wherein an excited state of said free radical compound includes stimulated emission in an infrared wavelength region.

35. The method of claim 34, wherein said optical waveguide is a polymer optical fiber.

36. The method of claim 34, wherein said optical waveguide is a glass optical fiber.

* * * * *